UNITED STATES PATENT OFFICE.

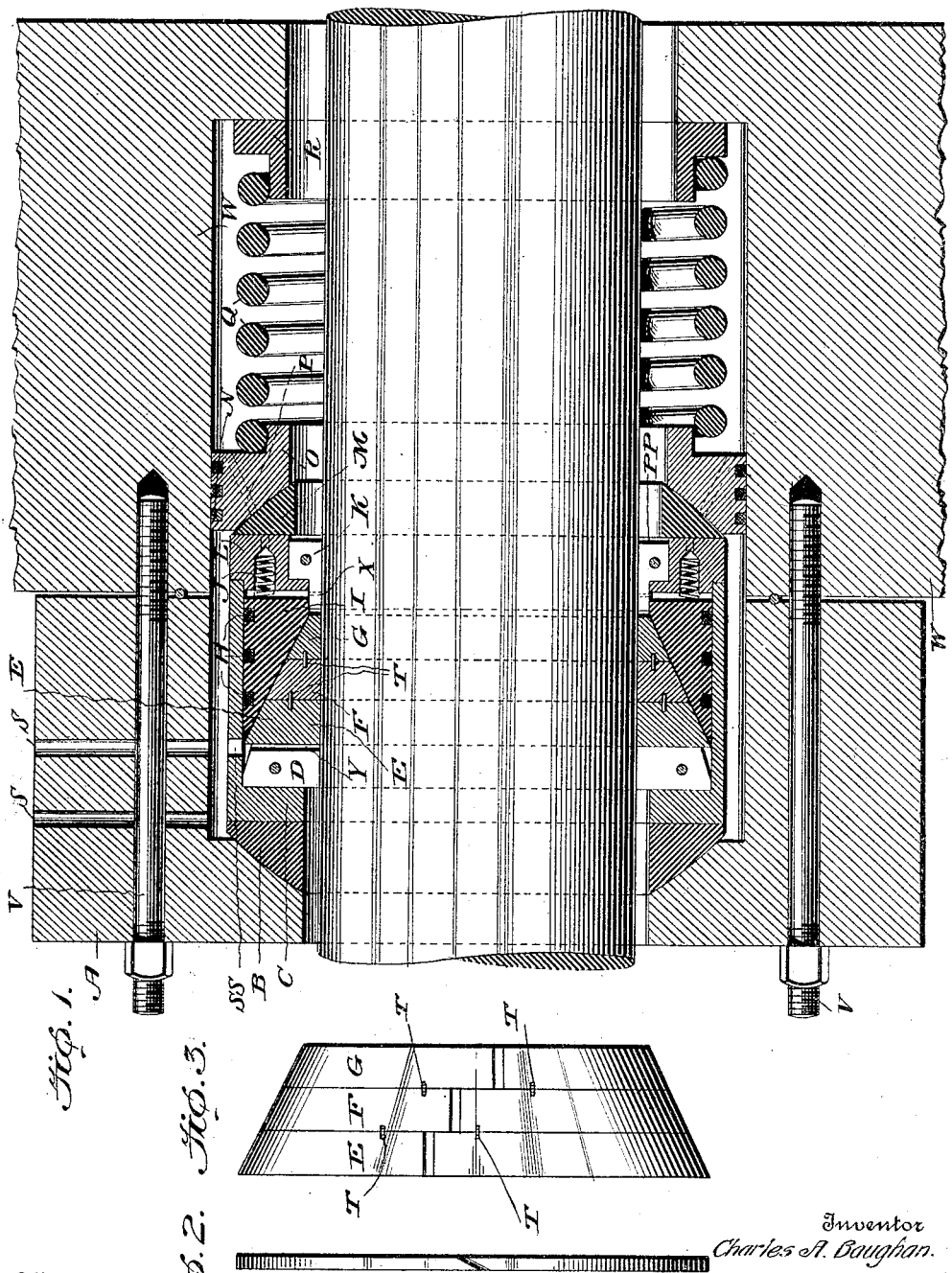

CHARLES A. BAUGHAN, OF CLIFTON FORGE, VIRGINIA.

ROD-PACKING.

1,197,593.　　Specification of Letters Patent.　Patented Sept. 12, 1916.

Application filed July 9, 1915. Serial No. 38,899.

*To all whom it may concern:*

Be it known that I, CHARLES A. BAUGHAN, a citizen of the United States, residing at Clifton Forge, in the county of Alleghany and State of Virginia, have invented certain new and useful Improvements in Rod-Packings, of which the following is a specification.

My invention relates to an improved rod packing, and especially to one designed for use in connection with piston rods where high pressure or superheated steam is employed in moving the piston within the cylinder.

Heretofore the use of superheated steam with the common rod packings, which generally comprise a packing ring or rings of relatively soft metal, such as Babbitt or other like metal, and where steam is admitted to the top of the packing, the extreme heat and steam pressure cause a disintegration and excessive wear of the packing rings and an excessive wear of the piston rod, and at the same time the packing does not prevent the steam from blowing through between the rod and packing. Constant renewals of the packing are thus necessary with the attendant cost.

The object of my invention is the provision of a rod packing which will obviate the imperfections appertaining to the packings mentioned and prevent the excessive wear of the piston rod and the packing rings and admit of the use of piston rings of brass, cast iron or other relatively hard metal which will wear much longer than the soft metal rings now commonly used.

My invention consists in a packing in which the packing rings and the vibrating cup are substantially isolated from direct steam pressure and also from the pressure of the main spring commonly used in connection with rod packings.

The invention further consists in certain novelties of construction and in the arrangement and combination of parts as herein set forth and claimed.

The accompanying drawing illustrates an example of the embodiment of the invention constructed and the parts combined according to the best mode of procedure I have so far devised for the purpose.

Figure 1 is a central vertical section in elevation of my improved rod packing. Fig. 2 shows one of the small supplemental resilient split expansible rings, six of which are shown in Fig. 1. Fig. 3 illustrates the three main packing rings detached from the combination.

Referring to the figures, A designates a gland; B, a ball joint ring; C, a sleeve cup; D, a split guide ring formed in two matching halves united by dowel pins as indicated; E, F and G, the main packing rings, each made in two like halves with their ends slightly spaced apart, as shown in Fig. 3, so they can contract, said rings also being connected by dowel pins T, see Figs. 1 and 3, and made of some relatively hard metal, such as brass, cast iron or other metal which will withstand heat and wear better than Babbitt or other soft metal; I, the vibrating cup; H, small split lap jointed expansible packing rings seated within recesses formed in the vibrating cup and bearing against the inner surface of the sleeve cup; L, a ring fashioned to match the end of the sleeve cup and form an extension thereof, said ring having a plurality of spaced recesses therein to receive helical springs J which bear against the vibrating cup ring and force it against the packing rings, contracting them so they will frictionally engage the surface of the piston rod and prevent the passage of steam; K, a split guide ring formed in two like halves and united by dowel pins in a similar way as the guide ring D herein described; M, a ball joint ring; O, a ring forming with ring M a ball joint and called a "preventer," said ring O being provided with circumferential recesses in its outer surface within which are seated the small supplemental cast iron split and expansible rings N which bear against the inner surface of the back cylinder head or stuffing box W and prevent the passage of steam to the space beneath the gland and above the main packing ring and the vibrating cup I, as shown; Q, the main pressure spring; and R is a spring retaining ring.

It should be observed that ground joints are to be formed between the gland A and ball joint ring B, between ring B and the sleeve cup C, between the end of the sleeve cup C and the ring L, between the ring L and the ball joint ring M, and between the ring M and the preventer ring O forming the ball joint. The ring L is counterbored to receive the guide ring K, and the end of the ring K spaced from the packing ring G, as shown by Fig. 1. The gland A is detachably secured by the stuffing box or cylinder head W by the threaded stud bolts V in a well known way. The packing rings are assembled so as to break joints, as shown by Fig. 3, and the guide rings D and K bear against the rod. Ground joints are also formed between the packing rings themselves and ring I.

The bearing parts are lubricated at one end by lubricant admitted to the passages S, S, in the gland to the space above the packing, and from thence a hole S S in the sleeve cup communicates with a small groove Y made in the ring D through which the lubricant can pass to the contact surfaces of D and E. The bearing surfaces at the other end are lubricated by the oil in the steam which can pass to the ball joint through the hole P, to the bearing between the ring M and ring L by way of the groove or grooves P P, and to the space between the ring L and the vibrating cup by way of the diminutive passages X spaced around the ring K. However, the quantity of steam admitted by the said passages, inasmuch as it must be fed to the passages by the travel of the piston rod, is very small and it is not sufficient to exert any substantial pressure upon the vibrating cup. Oil thus admitted to the space between the vibrating cup and the ring L can pass by the coiled springs and through the holes at the seats of the springs and lubricate the bearing surfaces of rings L and M additional to the other means for lubricating the same.

The parts assembled and combined in the relative positions as shown and described result in the substantial isolation of the main packing rings and the vibrating cup from the steam pressure and from the pressure of the main pressure spring Q, so the degree of contact pressure of the packing rings with the rod depends upon the spring capacity of the springs J and the degree of the angular contact surfaces between the vibrating cup and the outer surfaces of the packing rings. Obviously, the desired pressure can in any case be determined experimentally.

The mode of operation is as follows: When steam is admitted to the cylinder it passes outwardly along the rod to the space within the stuffing box or back cylinder head and is prevented from gaining access to the space beneath the gland and above the sleeve cup and ring L by the presence of the steam preventer ring O having the small expansible packing rings N which completely exclude it. However, a small quantity of steam will pass under ring K and by way of the holes X in the ring K to the space between rings I and L. The small expansible packing rings H prevent any steam passing over the top of the vibrating cup and consequently it cannot exert any downward pressure upon the packing rings. Furthermore, the steam which passes to the back end of ring K and to the front end of ring G can go no farther, by reason of the presence of a steam-tight joint between the packing rings E, F, G and the inclined surface of the vibrating cup, and it cannot pass beneath the packing rings and the rod, as the latter is in steam-tight contact with the packing rings.

It will be observed that the angular contact surfaces between the main packing rings and the inner surface of the vibrating cup is approximately 30 degrees measured with reference to the axis of the rod, and consequently a limited spring pressure is sufficient to cause the packing to closely hug the rod. At no time is there any direct steam pressure upon the top of the packing and the small amount of steam admitted to the space between rings I and L is negligible.

From the foregoing description taken in connection with the drawing it is clear that I have produced a rod packing in which the packing rings and vibrating cup are substantially isolated from steam pressure so as to permit the use of brass, cast iron, or other relatively hard metal packing rings which will not quickly wear away or become softened by heat and one which at the same time prevents excessive wear of the rod itself through the excessive pressure of the packing rings upon its surface. Steam cannot blow under the packing rings at any time, even after the same have become worn, inasmuch as the rings can contract and the vibrating cup can travel relative to the packing and the inner surface of the sleeve cup taking up the wear of the rings till its end has advanced under the pressure of the springs J into the space above the split guide ring D when it can travel no farther and then the packing rings must be replaced by others.

What I claim is:

1. The combination in a rod packing, of a rod, a contractible packing ring in contact with the rod, a vibrating cup engaging the packing ring, and means comprising a ring outside of and engaging the exterior surface of the vibrating cup, and rings at the end of said ring and at the end of the vibrating cup for substatnially isolating the said vibrating cup and packing ring from direct steam pressure.

2. The combination in a rod packing, of a rod, a plurality of contractible packing rings, a vibrating cup engaging the packing rings, and means comprising a ring outside the vibrating cup, a ring, as L, engaging the end of said ring, and a split ring engaging said ring L, for substantially isolating the said rings and vibrating cup from direct steam pressure.

3. The combination in a rod packing, of a rod, a main contractible packing ring, a vibrating cup, a sleeve cup and an extension ring matching the cup and inclosing the packing ring and vibrating cup, a plurality of springs for moving the vibrating cup relative to the packing ring, and means for substantially isolating the said packing ring and vibrating cup from direct steam pressure.

4. The combination in a rod packing, of a rod, a contractible packing ring, a vibrating cup, springs for moving the cup relative to the packing ring, a ring, as O, a main pressure spring, as Q, bearing against ring O, and means for isolating the packing ring and the vibrating cup from the pressure of the spring Q.

5. The combination in a rod packing, of a rod, a contractible packing ring, a vibrating cup, springs for moving the cup relative to the packing ring, a steam preventer ring, as O, a main pressure spring, and means for substantially isolating the packing ring and vibrating cup from steam pressure and the pressure of the main pressure spring.

6. The combination in a rod packing, of a rod, a sleeve cup and an extension ring at the open end of the sleeve cup, two split guide rings, and a packing ring and a vibrating cup located within the sleeve cup and between the guide rings, and springs for moving the vibrating cup relative to the packing ring.

7. The combination in a rod packing, of a rod, a sleeve cup and an extension ring at the open end of the sleeve cup, two split guide rings, a packing ring and a vibrating cup located within the sleeve cup and between the guide rings, springs for moving the vibrating cup relative to the packing ring, means for holding the extension ring in contact with the sleeve cup, a gland, a stuffing box or cylinder head, and means for forming ball joints between the said gland and stuffing box or cylinder head.

8. The combination in a rod packing, of a rod, a plurality of contractible packing rings having inclined or beveled surfaces and engaging the rod, a vibrating cup with a beveled or inclined surface engaging the beveled surfaces of the rings, spring means for moving the vibrating cup relative to the rings, and means comprising a ring outside of and frictionally engaging the exterior surface of the vibrating cup, for substantially isolating the packing rings from direct steam pressure.

9. The combination of a rod, a contractible packing ring in contact with the rod, a vibrating cup engaging the packing ring, a ring outside the vibrating cup and encircling the same, a small packing ring or rings between the said latter ring and the vibrating cup, and means for substantially excluding steam from the adjacent ends of the packing ring and the vibrating cup.

In testimony whereof I affix my signature.

CHARLES A. BAUGHAN.

Copies of this patent may be obtained for five cents each, by addressing the "Commissioner of Patents, Washington, D. C."